UNITED STATES PATENT OFFICE.

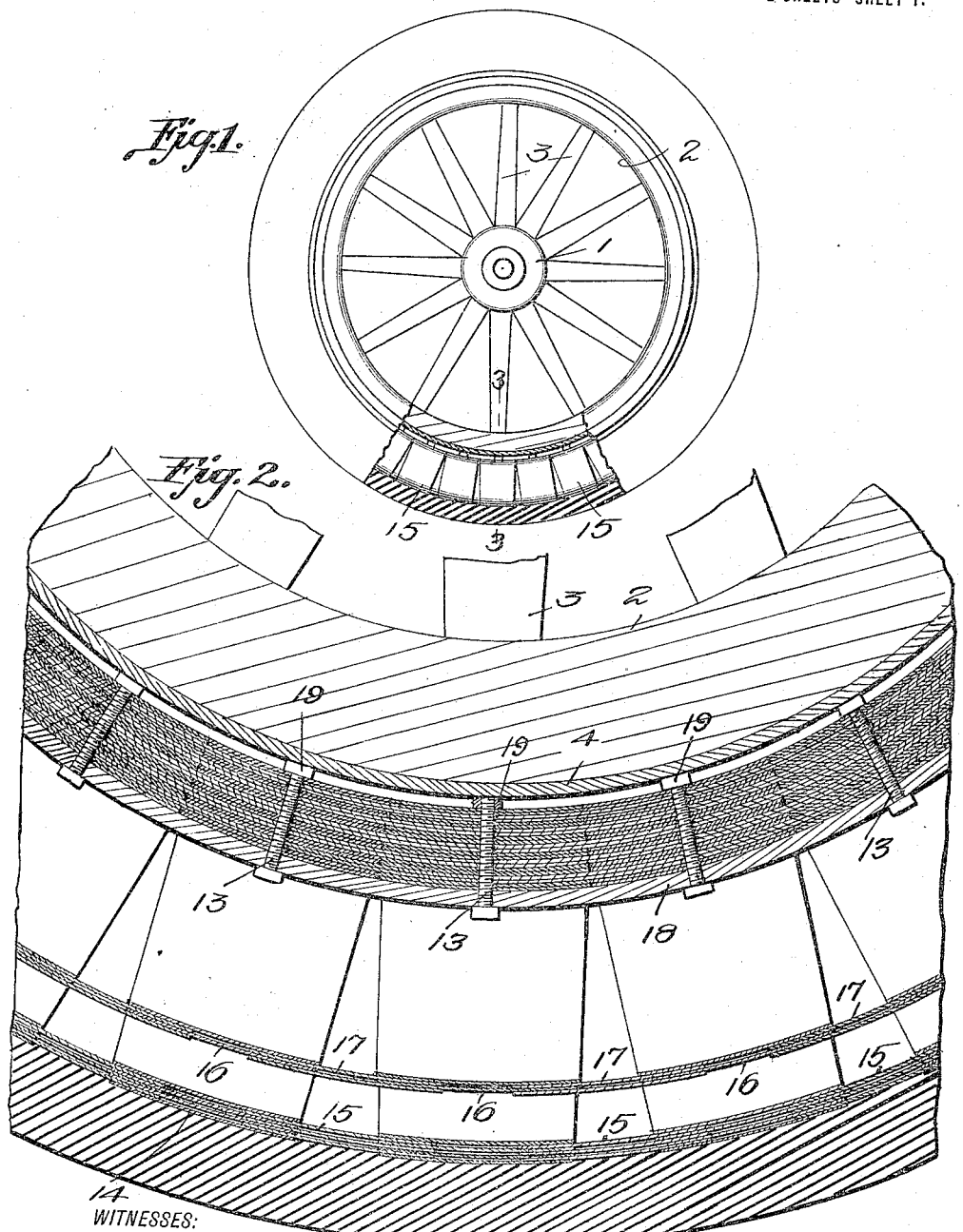

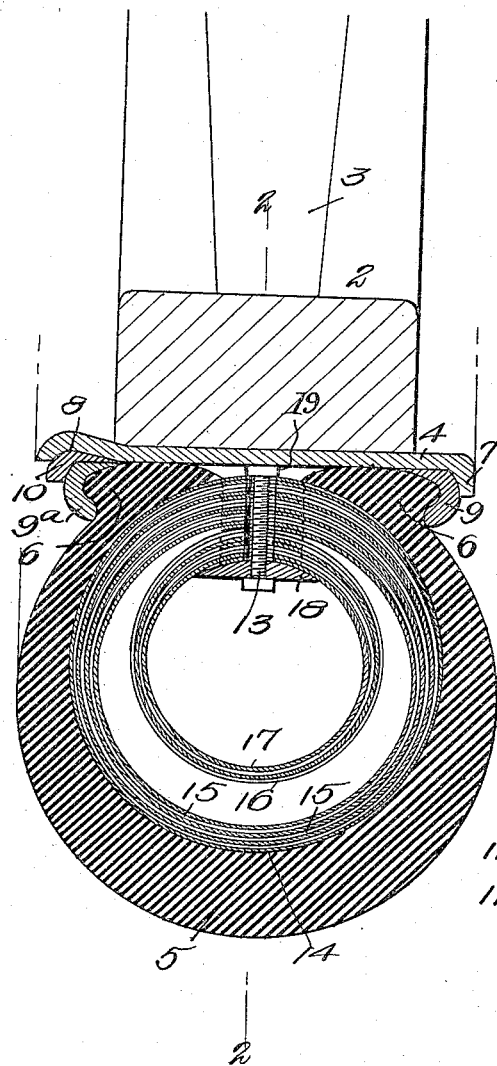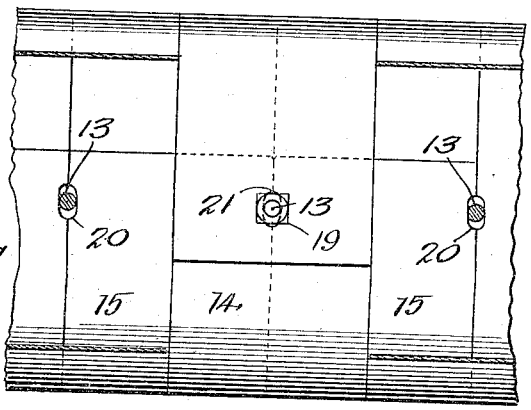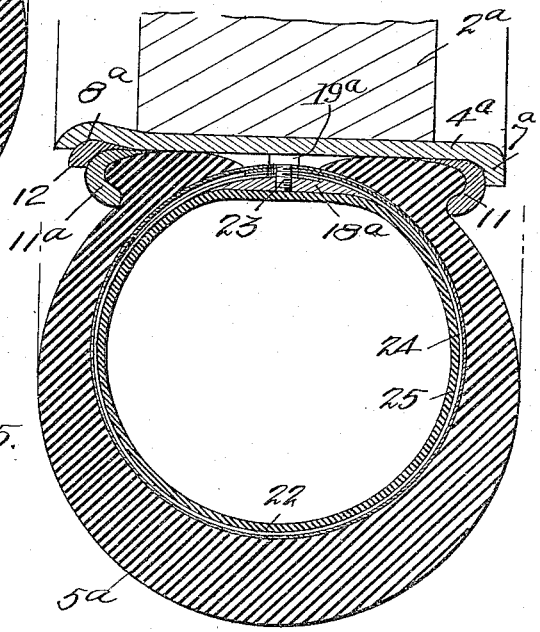

JOHN E. PARRISH, OF RICHMOND, VIRGINIA.

TIRE.

1,168,961.  Specification of Letters Patent.  Patented Jan. 18, 1916.

Application filed January 7, 1915. Serial No. 979.

*To all whom it may concern:*

Be it known that I, JOHN E. PARRISH, a citizen of the United States, and a resident of Richmond, in the county of Henrico and State of Virginia, have made certain new and useful Improvements in Tires, of which the following is a specification.

My invention is an improvement in tires such as are generally used in motor vehicles, and the invention has for its object to provide a resilient cushion for expanding a rubber shoe or casing, and for holding the said shoe expanded so that it may yield freely in every direction to cushion shock and jar, and wherein the mechanism is so arranged and so constructed that it will prevent injury to the shoe.

A further object is to produce a tire possessing both resiliency and strength to a marked degree, and this I accomplish by the use of a multiplicity of rings made of thin resilient metal strips and arranged in a plurality of series, the rings in one series overlapping those in another so that pressure on the outer series is communicated to adjacent rings in the next series and so on inward.

In the drawings: Figure 1 is a side view of a wheel provided with the improved tire with parts broken away, Fig. 2 is an enlarged sectional detail in the plane of the wheel, Fig. 3 is a transverse section of the tire and rim, Fig. 4 is a top plan view of the tire with parts broken away, and Fig. 5 is a view similar to Fig. 3 of a modified construction.

The present embodiment of the invention is shown in connection with a wheel consisting of a hub 1, a felly 2 of wood or the like, and spokes 3 connecting the hub with the felly. The felly is provided with a rim 4 for engagement by a shoe or casing 5, and the rim is of that type which permits the quick and easy removal of the shoe or casing. The shoe or casing is provided at each side edge with a holding rib 6, and the rim 4 has at one side edge an angular radial rib 7.

At the opposite side edge the rim has an external peripheral groove 8, and the ribs 6 of the shoe or casing are engaged by rings 9 and 9ª, the rings being similar, and the ring 9 being held by the rib 7. The other ring 9ª lies opposite the groove 8, and a wedge ring 10 is placed between the ring 9ª and the groove 8. Thus the shoe 5 is held in place on the wheel, while at the same time it may be quickly detached from the wheel and rim.

Coming now to the present invention which is the expanding mechanism designed to be placed inside a shoe 5 of the usual and ordinary construction, and which shoe is attached to the rim by the means above described or by any other equivalent means, I will say at the outset that this mechanism is made up of two groups of transversely disposed spring rings, one group being larger and fitting closely inside the shoe and the other group externally smaller than the internal diameter of the larger group so that normally it is out of contact with it excepting along the rim side where these groups are connected. The expanding mechanism also includes an annular ring or holding frame disposed inside the smaller group of transverse rings, and a series of bolts passing through this frame toward the hub of the wheel, thence through the rings of the smaller group, and thence through the rings of the larger group; and by preference I dispose the nuts on these bolts outside the rim 4 with which they have no engagement whatever, so that this expanding mechanism can be employed within an ordinary shoe or casing and in an ordinary rim such as are found on the market and in common use today, and it is held on the wheel only by being clamped rigidly within the shoe. This construction not only adapts my invention to the popular forms of shoes and ribs without requiring a change in either, but it adds to the resiliency of the complete tire in that it adapts the same to pressure and strain from various directions as when running over an obstruction or when rounding curves at high speed, in either of which instances the expanding mechanism will yield with the shoe.

Each group is made up of a multiplicity of layers of independent springs arranged in series as will be described below, and while I have shown only seven layers in the outer group and four layers in the inner group in Fig. 3, I desire it understood that in the finished tire and especially in a tire that is to sustain considerable load, there will be a larger number of layers, and in even the lightest tires I may not use as few layers as herein illustrated. The purpose of the larger group is to take the place of the pneumatic tire ordinarily employed, and it should be of a size to fill the shoe closely when the latter is clamped to the rim. The purpose of the smaller group is to assist the larger group in sustaining the load, because when the load (or shock) becomes sufficient to compress the springs in the larger group considerably, it is obvious that they come in contact with the springs of the smaller group and the latter come into play.

Every ring is made of a strip of resilient sheet metal, preferably steel of about one-sixty-fourth of an inch thick and approximately two inches wide, its length being such as is required. By preference this strip is of the same width throughout, and its length is sufficient to permit it to be bent into more than a complete circle so that its ends will overlap each other perhaps an inch, these ends being disposed toward the rim side of the tire as shown. Each layer is made up of a series of rings so formed, the inner side of each ring (where its ends lap each other) standing in contact edge to edge with the inner sides of the ring next adjacent in the same series all the way around the wheel; and each ring in each series being spaced, at the tread side of the tire, some little distance from the adjacent edges of the next rings in the same series, which follows from the fact that the strip metal is of substantially the same width throughout its length. Each group is made up of a plurality of these series so disposed with relation to each other that they break joint or have their individual rings in staggered relation, with the result that the group is formed of several layers of resilient rings, each layer being one of the series described. Such is the structure of the rings in both the larger and smaller groups, and in the drawings I have lettered the former 14 and 15 and the latter 16 and 17. As seen in Fig. 4, the lapping ends of the strip forming the ring 14 are pierced with openings 21, which must be elongated in the length of the strip for a purpose to appear below; while the strips forming the rings 15 will have elongated notches 20 in the side edges of their ends at points to register with each other when said ends are lapped and at such points that when two of these rings are assembled beneath a ring 14, their notches complement each other and the aggregate notches make up an elongated hole directly under the alined holes 21. Such is the structure of all the rings making up the several layers in this group, and such also is the structure of all the rings making up the several layers in the smaller group. Lengthwise throughout the two groups (and therefore around the wheel) is disposed a holding ring or frame 18 which is by preference of metal of proper weight and strength, plane on its outer surface which is nearest the tread of the tire and transversely arched on its inner surface so as to fit within the smaller group of rings as seen in Fig. 3. Passing through this frame from within the smaller group toward the hub of the wheel are bolts 13 which I preferably provide with threads throughout their entire length so that they may be screwed through the frame and thus held from dropping out of place as will be described below, and thence they pass through the registering notches 20 and the elongated holes 21 of the various rings, and receive nuts 19 on their inner ends. By preference the inner end of each bolt stands or is cut off flush with the inner face of its nut, and it does not engage with rim 4, if indeed it touches it at all.

While tires of somewhat similar structure have heretofore been contemplated, I find that certain details of structure and certain steps of method are required in building up my tire when any of the groups of springs has more than three layers to the group. In constructing the expanding mechanism above described, the holding frame is first provided with bolts 13 which are threaded through it from its outside radially inward, their nuts being omitted. I then apply the rings in the inner series of the smaller group, which are those numbered 17 in the drawings. If we assume that these rings are made up of strips which have the notches 20, when the ends of each strip are lapped with each other their notches come into registry and are passed over a bolt 13 as seen in Fig. 4, and the pair of notches at the other edges of these overlapping ends engage the next bolt 13. All the rings 17 around the wheel are thus applied. Next the rings 16 are placed around the rings 17 and overlapped so as to break joint therewith as above explained. Each ring 16 in its strip form has one hole or opening 21 passed over a bolt 13, then the strip is carried around outside the two rings 17 already formed, and the hole or opening 21 near its other end is passed over the outstanding bolt 13. One purpose of elongating this hole will now be obvious, because it must be made long enough to pass over the tip of the bolt 13 which is screwed rigidly through the frame 18. I might say that in some cases the nuts 19 in the finished tire could be loosened so as to permit a little play as the notches 20 and openings 21 move on the bolts during the compression and expansion of the rings when this tire is in use. Moreover, in the act of applying the ring 16 as just described, before passing its second opening 21 over the tip of the upstanding bolt 13 it is necessary to forcibly compress the underlying rings 17 and sufficiently reduce their circumference to permit the ring 16 to fall in place. This operation is repeated for the series of rings completely around the wheel, and this step is followed by a similar step which applies a third series yet outside the series of rings 16, and so on until the group is built up. Next the rings 15 making up the inner series of the larger group are put in place in the same manner, and then the rings 14 in the next larger series of this group, and so on until this group is built up completely around the wheel. Finally the nuts 19 are applied to the protruding ends of the bolts 13, and as above stated, these ends should not project beyond the nuts. The shoe 5 is then applied to the expanding mechanism, which latter becomes a yielding core or cushion and takes the place of the pneumatic tube in common daily use.

In Fig. 5 is shown a construction especially adapted for providing a puncture proof tire. In this construction the felly 2ª of the wheel has the rim 4ª having the rib 7ª and the groove 8ª, similar in all respects to the elements 4, 7 and 8 of Fig. 3. The shoe or casing 5ª is held in place by the rings, 11, 11ª and the wedge ring 12, corresponding to the rings 9, 9ª and 10.

This tire has the usual inner tube 22 and the expanding or cushioning mechanism is connected to an annular frame 18ª similar in all respects to the frame 18. Screw bolts 23 are used for connecting the rings 24 and 25 to the frame, the said bolts being threaded through the frame 18ª and then passed through the lapping ends of the rings and the nuts 19ª applied as above described. The rings 24 and 25 are arranged in precisely the same manner as the rings 14 and 15, the rings 24 alternating with and overlapping the rings 25. Thus a metallic lining is provided for the shoe, puncture proof but so arranged and constructed that it will yield freely in every direction. The inner tube held within this armor or shield of metal may be inflated in the usual manner, thus imparting resiliency to the tire, because of the air cushion within the tube, while at the same time it is absolutely protected from injury due to external causes. In either construction as many rings may be used as may be necessary to provide the desired resiliency.

It will be noted from an inspection of Fig. 2, that the rings are of uniform width, so that when arranged as shown even with their side edges abutting at the frame 18, their side edges will be spaced apart at the periphery of the cushion. Each ring contacts with two adjacent rings of the alternating series, and pressure on any ring or set of rings, is transmitted for a considerable distance on each side, around the periphery of the wheel. For instance, referring more particularly to Fig. 1 it will be seen that when in use, but a relatively small number relatively of the rings will be at the bottom of the wheel. That is, but a few rings are in direct contact with the supporting surface at any one time. However, when these contacting rings are deformed by pressure, contacting rings on each side must partake of the deformation, since their side edges overlap other rings.

Those rings next to the contacting rings in turn deform other rings, and this yielding or displacement or deformation is transmitted over approximately half of the wheel. Hence the tire is very resilient, having the resiliency of the pneumatic tire without the defects of the said tire, such as liability to injury from external causes.

By arranging the rings in the manner shown in Figs. 2 and 3, that is with one group contacting with the inner surface of the shoe or casing, and another within but spaced from the first-named groups, a particular function results. Under ordinary load only the outermost rings are deformed, the innermost remaining unchanged until the weight is sufficient to bring them into play. Thus the car will be effectually cushioned against shock or jar whatever the conditions that may obtain.

By arranging the bolts as shown in Fig. 3, and threading the entire length of the bolt, the improved tire is very easily assembled. In assembling, the bolt is passed through the threaded opening in the frame 18 and then through the holes and notches in the lapping ends of the rings. When the last ring is in place the nut 19 is engaged with the bolt, to lock the parts together. The bolts should be of such length that when the tire is completely assembled the end of the bolt will be flush with the outer face of the nut, and the said outer faces of the nuts will rest on the rim 4.

I claim:—

1. A tire cushion comprising an unbroken ring-shaped holding frame; larger and smaller groups of resilient rings transverse to and inclosing said frame and the larger group loosely inclosing the smaller, each group made up of more than two series of such rings disposed in staggered relation to each other, each ring formed of a strip of sheet metal of one width throughout and having its ends lapped over each other across said frame and standing edge to edge against the lapping ends of the next rings in the same series; and means for connecting all rings loosely to the frame to permit their lapping ends to slide thereon.

2. A tire cushion comprising a ring-shaped holding frame; a plurality of groups of resilient rings transverse to and inclosing said frame and each made up of a multiplicity of series of rings disposed in staggered relation to each other, each ring formed of a strip of sheet metal having its ends lapped over each other across said frame and standing edge to edge against the lapping ends of the next rings in the same series, said ends in one series having registering openings at the transverse center of the strip and said ends in the next series having notches at both edges of the strip registering with such openings; and bolts through the frame and the alined openings and notches.

3. A tire cushion comprising a ring-shaped holding frame; a plurality of series of resilient rings transverse to and inclosing said frame and disposed in staggered relation to each other, each ring formed of a strip of sheet metal having its ends lapped over said frame and standing edge to edge against the lapping ends of the next rings in the same series, said ends in one series having registering openings at the transverse center of the strip and elongated lengthwise thereof and said ends in the next series having elongated notches at both edges of the strip elongated lengthwise thereof and registering with such openings; and screw-bolts threaded through the frame radially inward of the tire and passing through the alined openings and notches.

4. A tire cushion comprising a ring-shaped holding frame; two groups of resilient rings transverse to and inclosing said frame, each group made up of a multiplicity of series of such rings disposed in staggered relation to each other, each ring formed of a strip of sheet metal having its ends lapped over the inner face of said frame and standing edge to edge against the lapping ends of the next rings in the same series, said ends in one series having registering openings at the transverse center of the strip elongated lengthwise thereof and said ends in the next series having notches at both edges of the strip elongated lengthwise thereof and registering with such openings; and screw-bolts threaded through the frame radially inward of the tire and passing loosely through the alined openings and notches with their heads adjacent the outer face of said frame and their nuts adjacent the lapping ends most remote from said frame.

5. A tire cushion made up of individual resilient rings standing transverse to the length of the tire and each ring consisting of a metal strip bent into circular form with its ends lapping each other, said cushion comprising a larger group of the rings and a smaller group within the larger, and each group being made up of a multiplicity of series of such rings closely inclosing each other with the individual rings in each layer contacting edge to edge where their ends are lapped and breaking joint with the rings in the contiguous layer throughout the series; and fastening bolts passing from within the smaller group through the lapping ends of rings in one of its series, between the rings of the next series, and so on throughout all its series, and similarly throughout the series of the larger group.

6. A tire cushion made up of individual resilient rings standing transverse to the length of the tire and each ring consisting of a metal strip bent into circular form with its ends lapping each other, said cushion comprising a larger group of the rings and a smaller group within the larger, and each group being made up of a multiplicity of series of such rings closely inclosing each other with the individual rings in each layer contacting edge to edge where their ends are lapped and breaking joint with the rings in the contiguous layer throughout the series, the lapping ends of individual rings throughout all the series of both groups being provided in alternate layers respectively with registering openings at the transverse center of the strips and elongated longitudinally thereof and with registering notches in the side edges of the strips also elongated longitudinally thereof; and fastening bolts passing from within the innermost series of the smaller group radially through both groups and alternately through said openings and notches of the rings in all series.

JOHN E. PARRISH.

Witnesses:
C. E. TRAINOR,
SOLON C. KEMON.

Copies of this patent may be obtained for five cents each, by addressing the "Commissioner of Patents, Washington, D. C."